(12) United States Patent
Wang

(10) Patent No.: US 12,493,690 B2
(45) Date of Patent: Dec. 9, 2025

(54) MEMORY DEVICE AND PROTECTION METHOD THEREOF

(71) Applicant: NANYA TECHNOLOGY CORPORATION, New Taipei (TW)

(72) Inventor: Kuo-Chiang Wang, Taoyuan (TW)

(73) Assignee: NANYA TECHNOLOGY CORPORATION, New Taipei (TW)

( * ) Notice: Subject to any disclaimer, the term of this patent is extended or adjusted under 35 U.S.C. 154(b) by 318 days.

(21) Appl. No.: 18/166,489

(22) Filed: Feb. 9, 2023

(65) Prior Publication Data

US 2024/0273194 A1 Aug. 15, 2024

(51) Int. Cl.
| | |
|---|---|
| G06F 21/00 | (2013.01) |
| G06F 11/14 | (2006.01) |
| G06F 21/55 | (2013.01) |
| G06F 21/56 | (2013.01) |
| H04L 29/06 | (2006.01) |

(52) U.S. Cl.
CPC ........ *G06F 21/554* (2013.01); *G06F 11/1458* (2013.01); *G06F 21/566* (2013.01); *G06F 2201/84* (2013.01); *G06F 2221/034* (2013.01)

(58) Field of Classification Search
CPC .. G06F 21/554; G06F 11/1458; G06F 21/566; G06F 2201/84; G06F 2221/034; G11C 11/4078; G11C 11/4094
See application file for complete search history.

(56) References Cited

U.S. PATENT DOCUMENTS

| | | | | |
|---|---|---|---|---|
| 11,568,917 | B1* | 1/2023 | Shin | G11C 11/4078 |
| 2016/0260417 | A1* | 9/2016 | Asai | G09G 5/397 |
| 2017/0287544 | A1* | 10/2017 | Hedden | G11C 11/406 |
| 2018/0081802 | A1* | 3/2018 | Luo | G06F 13/1694 |
| 2019/0163712 | A1* | 5/2019 | Whitmer | H04L 69/04 |
| 2020/0058346 | A1* | 2/2020 | Ito | G11C 11/4087 |
| 2020/0159413 | A1* | 5/2020 | Seal | G06F 3/065 |
| 2021/0049269 | A1* | 2/2021 | Ghosh | G06F 21/79 |
| 2021/0064743 | A1 | 3/2021 | Hush et al. | |
| 2021/0405910 | A1* | 12/2021 | Troia | G11C 16/349 |
| 2022/0199186 | A1* | 6/2022 | Jung | G11C 11/408 |
| 2023/0143468 | A1* | 5/2023 | Hong | G11C 11/4087 |
| | | | | 365/222 |
| 2023/0154522 | A1* | 5/2023 | Kim | G06F 7/5443 |
| | | | | 365/222 |
| 2023/0215484 | A1* | 7/2023 | Jung | G11C 11/40622 |
| | | | | 365/222 |

(Continued)

OTHER PUBLICATIONS

Pietro Frigo et al., TRRespass: Exploiting the Many Sides of Target Row Refresh (2020 IEEE Symposium on Security and Privacy, Date of Conference: May 18-21, 2020, Date Added to IEEE Xplore: Jul. 30, 2020 ).

*Primary Examiner* — Lisa C Lewis
(74) *Attorney, Agent, or Firm* — CKC & Partners Co., LLC

(57) ABSTRACT

A memory device is disclosed. The memory device includes a memory array, a protection circuit, and a control circuit. The memory array includes several memory rows. The protection circuit is configured to determine a first row of the several memory rows to be a victim row. The control circuit is coupled to the memory array and the protection circuit, and the control circuit is configured to back up a data stored in the first row to a second row of the several memory rows. The victim row is hammer attacked.

20 Claims, 2 Drawing Sheets

(56) References Cited

U.S. PATENT DOCUMENTS

| | | | |
|---|---|---|---|
| 2023/0236731 A1* | 7/2023 | Lu ....................... | G11C 11/4087 |
| | | | 711/105 |
| 2023/0238046 A1* | 7/2023 | Gieske .............. | G11C 11/40618 |
| | | | 365/222 |
| 2023/0326511 A1* | 10/2023 | Oh .................... | G11C 11/4063 |
| | | | 365/222 |
| 2023/0386598 A1* | 11/2023 | Yoo .................... | G06F 11/0766 |
| 2024/0038291 A1* | 2/2024 | Gieske ................ | G11C 11/4078 |
| 2024/0096391 A1* | 3/2024 | Cho .................. | G11C 11/40622 |
| 2024/0144990 A1* | 5/2024 | Kim .................. | G11C 11/40603 |

\* cited by examiner

MEMORY DEVICE AND PROTECTION METHOD THEREOF

BACKGROUND

Technical Field

The present disclosure relates to memory technology. More particularly, the present disclosure relates to a memory device and a protection method thereof for recovering from the hammer attack.

Description of Related Art

The row hammer attack is an attack to a memory storage area which takes advantage of the accidental charge leakage effect of the memory during operation. The hammer attack can cause storage cells to leak charge and caused the bit flips.

Some methods are provided to prevent hammer attack. One of the methods is to refresh the memory frequently. However, refreshing the memory is unable to recover the lost data, and the power of power consumption is caused.

SUMMARY

An aspect of the present disclosure is to provide a memory device. The memory device includes a memory array, a protection circuit, and a control circuit. The memory array includes several memory rows. The protection circuit is configured to determine a first row of the several memory rows to be a victim row. The control circuit is coupled to the memory array and the protection circuit, and the control circuit is configured to back up a data stored in the first row to a second row of the several memory rows. The victim row is hammer attacked.

Another aspect of the present disclosure is to provide a protection method, suitable for a memory device. The protection method includes the following operations: determining a first row of the several memory rows of a memory array of the memory device to be a victim row by a protection circuit of the memory device; and back upping a data stored in the first row to a second row of the several memory rows by a control circuit of the memory device. The victim row is hammer attacked.

BRIEF DESCRIPTION OF THE DRAWINGS

The present disclosure can be more fully understood by reading the following detailed description of the embodiment, with reference made to the accompanying drawings as follows.

DETAILED DESCRIPTION

In order to make the description of the disclosure more detailed and comprehensive, reference will now be made in detail to the accompanying drawings and the following embodiments. However, the provided embodiments are not used to limit the ranges covered by the present disclosure; orders of step description are not used to limit the execution sequence either. Any devices with equivalent effect through rearrangement are also covered by the present disclosure.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises" and/or "comprising," or "includes" and/or "including" or "has" and/or "having" when used in this specification, specify the presence of stated features, regions, integers, steps, operations, elements, and/or components, but do not preclude the presence or addition of one or more other features, regions, integers, steps, operations, elements, components, and/or groups thereof.

In this document, the term "coupled" may also be termed as "electrically coupled," and the term "connected" may be termed as "electrically connected." "Coupled" and "connected" may also be used to indicate that two or more elements cooperate or interact with each other.

Figure 1:
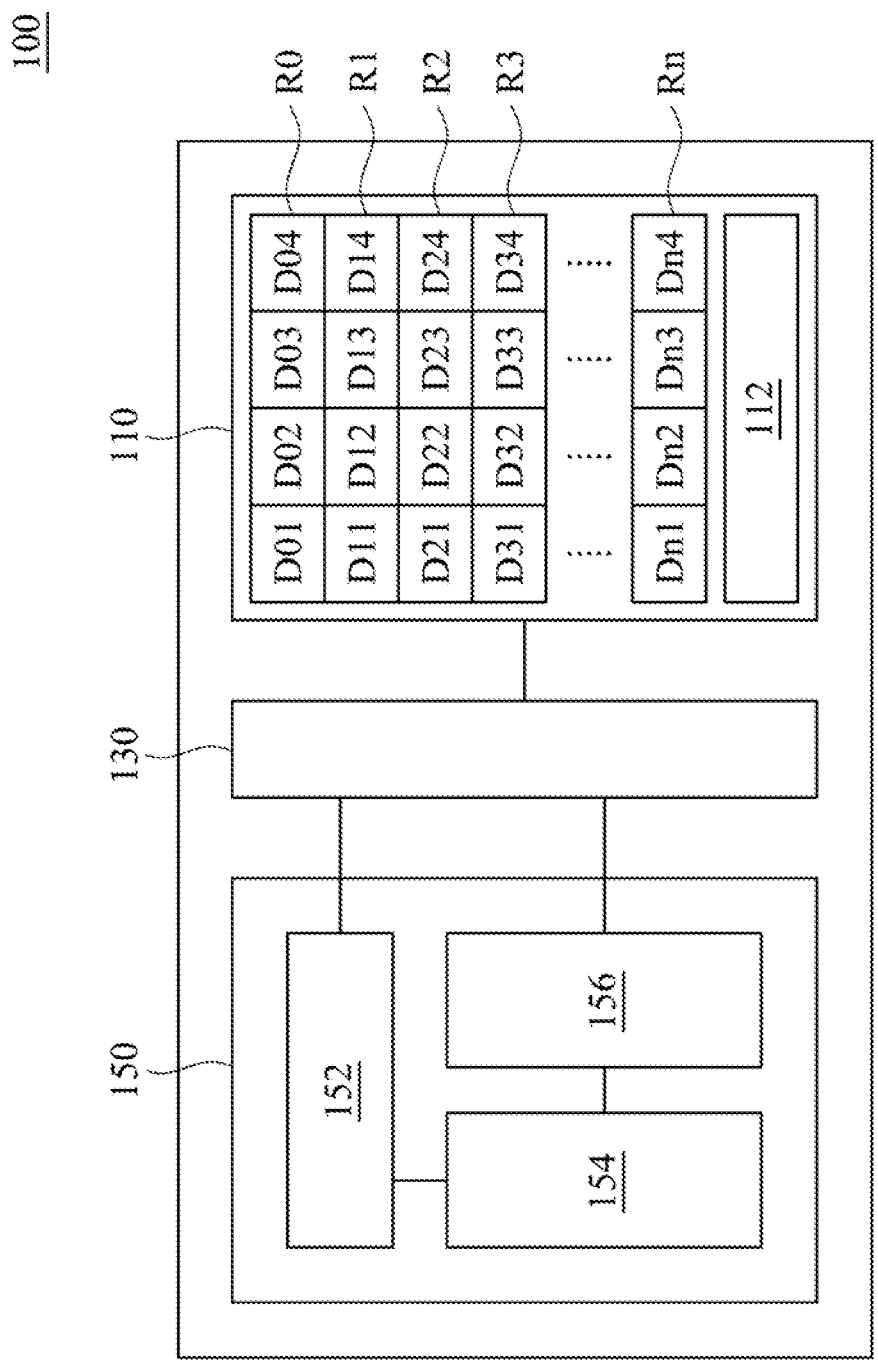
FIG. 1 is a schematic diagram of a memory device according to an embodiment of the present disclosure.

Reference is made to FIG. 1. FIG. 1 is a schematic diagram of a memory device 100 according to an embodiment of the present disclosure. The memory device 100 includes a memory array 110, a control circuit 130, and a protection circuit 150. The control circuit 130 is coupled to the memory array 110 and the protection circuit 150. As shown in FIG. 1, the memory array 110 includes several memory rows R0 to Rn, and the memory rows R0 to Rn are configured to store data D01 to Dn4.

In detail, the memory row R0 stores data D01 to D04, the memory row R1 stores data D11 to D14, the memory row R2 stores data D21 to D24, and so on.

It should be noted that the number of rows of the memory array 110 and the number of data stored in each row illustrated in FIG. 1 are for illustrative purposes only, and the embodiments of the present disclosure are not limited thereto.

As illustrated in FIG. 1, in some embodiments, the protection circuit 150 includes a row filter circuit 152, a hammer counter circuit 154, and a victim row distributer circuit 156. The row filter circuit 152 is coupled to the hammer counter circuit 154, and the hammer counter circuit 154 is coupled to the victim row distributer circuit 156. The row filter circuit 152 and the victim row distributer circuit 156 are coupled to the control circuit 130.

The memory device 100 as illustrated in FIG. 1 is for illustrative purposes only, and the embodiments of the present disclosure are not limited thereto. The operation method of the memory device 100 as illustrated in FIG. 1 will be described in detail with reference to FIG. 2.

Figure 2:
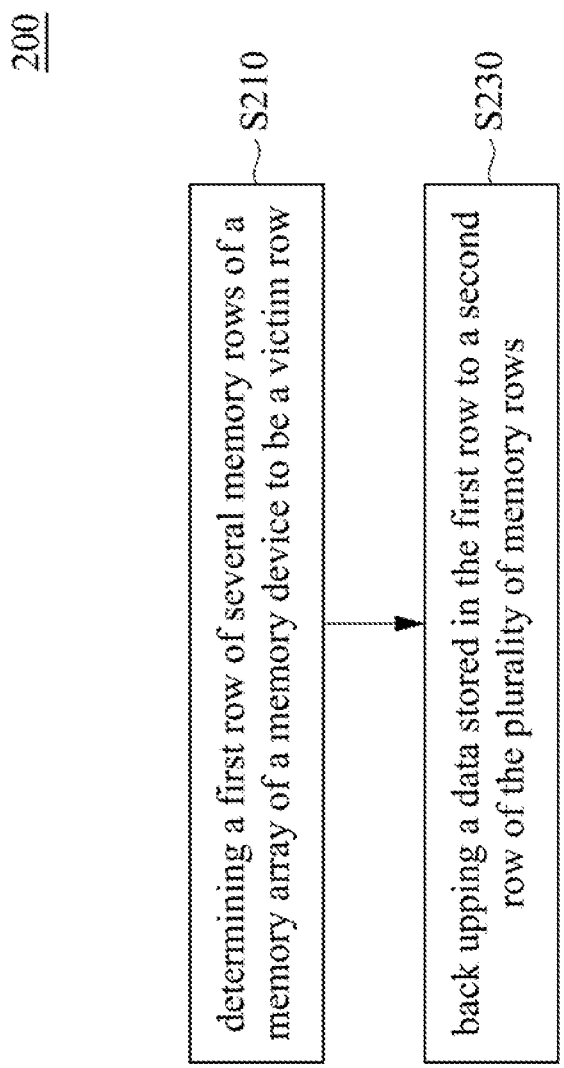
FIG. 2 is a schematic diagram of a protection method of a memory device in accordance with an embodiment of the present disclosure.

Reference is made to FIG. 2. FIG. 2 is a protection method 200 of a memory device 100 in accordance with an embodiment of the present disclosure. The protection method 200 includes operations S210 to S230. These operations are given for illustrative purposes. Additional operations are within the contemplated scoped of the present disclosure.

In operation S210, a first row of several memory rows of a memory array of a memory device is determined to be a victim row. In some embodiments, operation S210 is performed by the protection circuit 150 as illustrated in FIG. 1.

In some embodiments, the protection circuit 150 obtains the triggered numbers of the memory rows R0 to Rn, and the memory row with the triggered number greater than a triggered number threshold is determined as a victim row.

In some embodiments, more than one of the memory rows R0 to Rn are determined to be the victim rows. For example, when the triggered number of the memory row R0 and the triggered number of the memory row R1 are greater than the triggered number threshold, the memory rows R0 and R1 are determined as the victim rows.

In some embodiments, the victim rows are the memory rows that are hammer attacked.

Reference is made to FIG. 1 together. In some embodiments, in operation S210, the row filter circuit 152 is configured to select several candidate rows from the memory rows R0 to Rn. In some embodiments, the row filter circuit 152 is further configured to select several candidate rows from the memory rows R0 to Rn. In some embodiments, the row filter circuit 152 select the candidate rows according to the triggered numbers of the memory rows R0 to Rn and the triggered number threshold.

For example, when the triggered number of the memory row R0, the triggered number of the memory row R1, and the triggered number of the memory row R2 are greater than the triggered number threshold, the row filter circuit 152 selects the memory rows R0 to R2 as the candidate rows.

In some embodiments, in operation S210, after the candidate rows are selected, the row filter circuit, the hammer counter circuit 154 as illustrated in FIG. 1 is configured to rank the candidate rows. In some embodiments, the hammer counter circuit 154 is configured to rank the candidate rows according to the triggered numbers.

For example, when the triggered number of the memory row R0 is higher than the triggered number of the memory row R1, and the triggered number of the memory row R1 is higher than the triggered number of the memory row R2, the hammer counter circuit 154 determines that the priority of the memory row R0 is higher than the memory row R1, and the priority of the memory row R1 is higher than the memory row R2.

In some embodiments, in operation S210, the victim row distributer circuit 156 is configured to trigger the control circuit 130 according to a ranking result of the candidate rows.

For example, when the priority of the memory row R0 is higher than the memory row R1, and the priority of the memory row R1 is higher than the memory row R2, according to the ranking result mentioned above, the victim row distributer circuit 156 triggers the control circuit 130 to perform operation S230 for the memory array R0 first, triggers the control circuit 130 to perform operation S230 for the memory array R1 next, and triggers the control circuit 130 to perform operation S230 for the memory array R2 last.

In operation S230, a data stored in the first row is back upped to a second row of the plurality of memory rows. In some embodiments, the operation S230 is performed by the control circuit 130 as illustrated in FIG. 1.

In some embodiments, the control circuit 130 backs up the data of the victim row to another row of the memory array 110. The another row of the memory array 110 as mentioned above is a memory row that is not hammer attacked.

In some embodiments, the control circuit 130 backs up the data of the victim row to a dummy row of the memory array 110. For example, assume that the memory row R0 is the victim row and the memory row Rn is the dummy row, the control circuit backs up the data D01 to D04 stored in the memory row R0 to the memory row Rn.

In some embodiments, the control circuit 130 backs up the data of the victim row to a SRAM (static random access memory) storage area. For example, as illustrated in FIG. 1, the memory array 110 includes a SRAM storage area 112. The control circuit 130 backs up the data D01 to D04 of the victim row R0 to the SRAM storage area 112.

In some embodiments, in operation S230, before back upping the data of the victim rows, the control circuit 130 is further configured to compress the data stored in the victim row. After compressing the data, the control circuit 130 stores the compressed data to another memory row which is not hammer attacked.

In some embodiments, in operation S230, before back upping the data of the victim rows, the control circuit 130 is further configured to encrypt the data stored in the victim row. After encrypting the data, the control circuit 130 stores the encrypted data to another memory row which is not hammer attacked.

In some embodiments, the operation S230 is performed according to the ranking result of the candidate rows in operation S210. For example, when the priority of the memory row R0 is higher than the memory row R1, and the priority of the memory row R1 is higher than the memory row R2, according to the ranking result mentioned above, the control circuit 130 performs operation S230 to back up the data stored in the memory array R0 first, performs operation S230 to back up the data stored in the memory array R1 next, and performs operation S230 to back up the data stored in the memory array R2 last.

In some embodiments, in operation S230, the control circuit 230 determines where the data of the victim rows is back upped.

In sum, the embodiments of the present disclosure provides a memory device and a protection method thereof, by back upping the data of the victim rows to a dummy row of the memory array, the hammer attack can be avoided. Furthermore, since the memory device does not need to refresh the data frequently, the problem of power consumption while refreshing the data can be avoided. Moreover, since only the data being hammer attacked is back upped, only a limited storage space is in need.

Although the present disclosure has been described in considerable detail with reference to certain embodiments thereof, other embodiments are possible. Therefore, the spirit and scope of the appended claims should not be limited to the description of the embodiments contained herein.

In addition, the above illustrations comprise sequential demonstration operations, but the operations need not be performed in the order shown. The execution of the operations in a different order is within the scope of this disclosure. In the spirit and scope of the embodiments of the present disclosure, the operations may be increased, substituted, changed and/or omitted as the case may be.

It will be apparent to those skilled in the art that various modifications and variations can be made to the structure of the present disclosure without departing from the scope or spirit of the present disclosure. In view of the foregoing, it is intended that the present disclosure cover modifications and variations of the present disclosure provided they fall within the scope of the following claims.

What is claimed is:

1. A memory device, comprising:
  a memory array, comprising a plurality of memory rows;
  a protection circuit, configured to determine a first row of the plurality of memory rows to be a victim row; and
  a control circuit, coupled to the memory array and the protection circuit, wherein the control circuit is configured to back up a data stored in the first row to a second row of the plurality of memory rows according to a priority of each of the memory rows, wherein the priority is related to a triggered number of the each of the memory rows;
  wherein the victim row is hammer attacked.

2. The memory device of claim 1, wherein the second row of the plurality of memory rows is a dummy row.

3. The memory device of claim 1, wherein the second row of the plurality of memory rows is a SRAM (static random access memory) storage area.

4. The memory device of claim 1, wherein the control circuit is further configured to compress the data stored in the first row before back upping the data stored in the first row.

5. The memory device of claim 1, wherein the control circuit is further configured to encrypt the data stored in the first row before back upping the data stored in the first row.

6. The memory device of claim 1, wherein the protection circuit further comprises:
a row filter circuit, configured to select a plurality of candidate rows from the plurality of memory rows, wherein the candidate rows are rows that the triggered numbers of each of the memory rows are greater than a triggered number threshold.

7. The memory device of claim 6, wherein the row filter circuit is further configured to select the plurality of candidate rows according to the triggered numbers of the plurality of memory rows and the triggered number threshold.

8. The memory device of claim 7, wherein when a first triggered number of a third memory row of the plurality of memory rows is greater than the triggered number threshold, the third memory row is determined as one of the plurality of candidate rows.

9. The memory device of claim 6, wherein the protection circuit further comprises:
a hammer counter circuit, coupled to the row filter circuit, wherein the hammer counter circuit is configured to rank the plurality of candidate rows.

10. The memory device of claim 9, wherein the protection circuit further comprises:
a victim row distributer circuit, coupled to the hammer counter circuit, wherein the victim row distributer circuit is configured to trigger the control circuit according to a ranking result of the plurality of candidate rows.

11. A protection method, suitable for a memory device, comprising:
determining a first row of a plurality of memory rows of a memory array of the memory device to be a victim row by a protection circuit of the memory device; and
backing up a data stored in the first row to a second row of the plurality of memory rows by a control circuit of the memory device according to a priority of each of the memory rows, wherein the priority is related to a triggered of the each of the memory rows;
wherein the victim row is hammer attacked.

12. The protection method of claim 11, wherein the second row of the plurality of memory rows is a dummy row.

13. The protection method of claim 11, wherein the second row of the plurality of memory rows is a SRAM storage area.

14. The protection method of claim 11, further comprising:
compressing the data stored in the first row before back upping the data sored in the first row.

15. The protection method of claim 11, further comprising:
encrypting the data stored in the first row before back upping the data stored in the first row.

16. The protection method of claim 11, further comprising:
selecting a plurality of candidate rows from the plurality of memory rows by a row filter circuit of the protection circuit, wherein the candidate rows are rows that the triggered numbers of each of the memory rows are greater than a triggered number threshold.

17. The protection method of claim 16, further comprising:
selecting the plurality of candidate rows according to the triggered numbers of the plurality of memory rows and the triggered number threshold.

18. The protection method of claim 17, further comprising:
determining a third memory row as one of the plurality of candidate rows when a first triggered number of the third memory row of the plurality of memory rows is greater than the triggered number threshold.

19. The protection method of claim 16, further comprising:
ranking the plurality of candidate rows by a hammer counter circuit of the protection circuit.

20. The protection method of claim 19, further comprising:
triggering the control circuit according to a ranking result of the plurality of candidate rows.

* * * * *